United States Patent [19]

Fischer et al.

[11] Patent Number: 4,783,651

[45] Date of Patent: Nov. 8, 1988

[54] LINEAR D.C. GAS DISCHARGE DISPLAYS AND ADDRESSING TECHNIQUES THEREFOR

[75] Inventors: Dieter Fischer, Frankfurt; Karl-Heinz Vatterott, Duderstadt, both of Fed. Rep. of Germany

[73] Assignee: Ta Triumph-Adler Aktiengesellschaft, Nuremburg, Fed. Rep. of Germany

[21] Appl. No.: 45,240

[22] Filed: May 5, 1987

Related U.S. Application Data

[63] Continuation of Ser. No. 538,323, Oct. 3, 1983, abandoned.

[51] Int. Cl.⁴ .............................................. G09G 3/06
[52] U.S. Cl. ..................................... 340/771; 340/714; 340/775; 315/169.4
[58] Field of Search ............... 340/713, 714, 771, 775; 315/169.4

[56] References Cited

U.S. PATENT DOCUMENTS

| | | | |
|---|---|---|---|
| 3,752,994 | 8/1973 | Grier et al. | 340/771 |
| 3,796,997 | 3/1974 | Johnson et al. | 340/714 |
| 3,976,994 | 8/1976 | Washizuka et al. | 340/791 |
| 4,079,370 | 3/1978 | Mikoshiba et al. | 340/775 |
| 4,107,576 | 8/1978 | Ogle et al. | 340/714 |
| 4,127,794 | 11/1978 | Frankland | 315/169.4 |
| 4,171,524 | 10/1979 | Lorteije et al. | 340/713 |
| 4,302,756 | 11/1981 | Frankland | 340/771 |
| 4,430,564 | 2/1984 | Fischer | 315/169.4 |
| 4,450,441 | 5/1984 | Person et al. | 340/771 |

Primary Examiner—Gerald L. Brigance
Assistant Examiner—Jeffery A. Brier
Attorney, Agent, or Firm—Browdy and Neimark

[57] ABSTRACT

A linear D.C. gas discharge display is provided wherein light emissions resulting from the application of video pulse trains to a linear array of preionized illuminable gas discharge cells comprising the display are used for selective point to point exposure and discharge of a uniformly electrostatically charged photoconductive insulator to thereby produce a latent electrostatic charge image for development. Various embodiments are disclosed for conditioning and addressing the array of illuminable gas discharge cells.

3 Claims, 5 Drawing Sheets

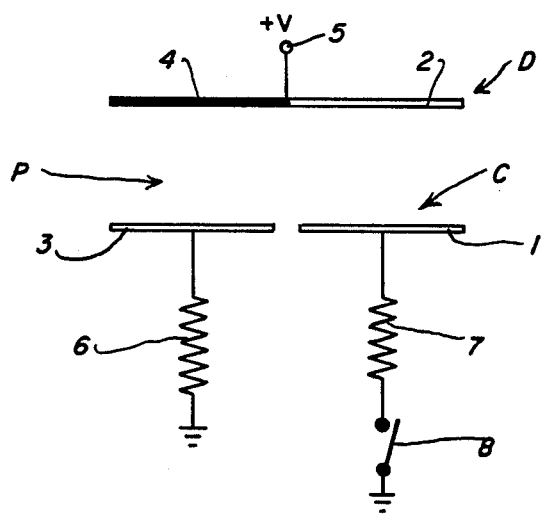
Fig_1
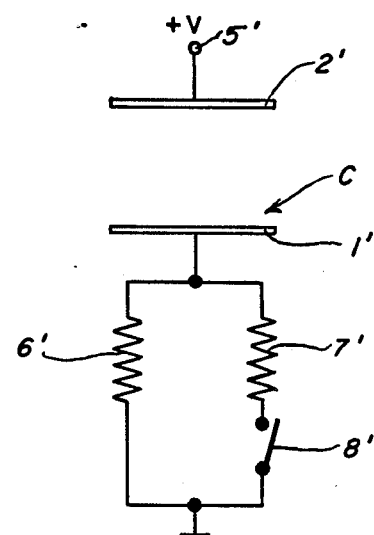
Fig_2
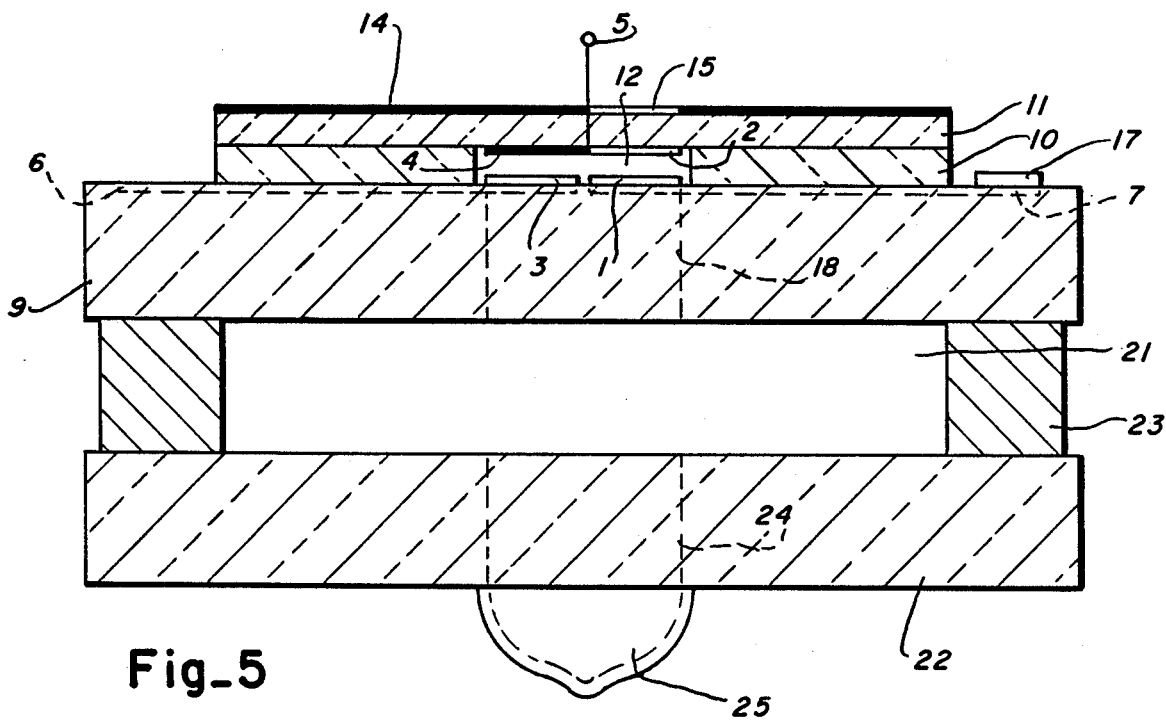
Fig_5

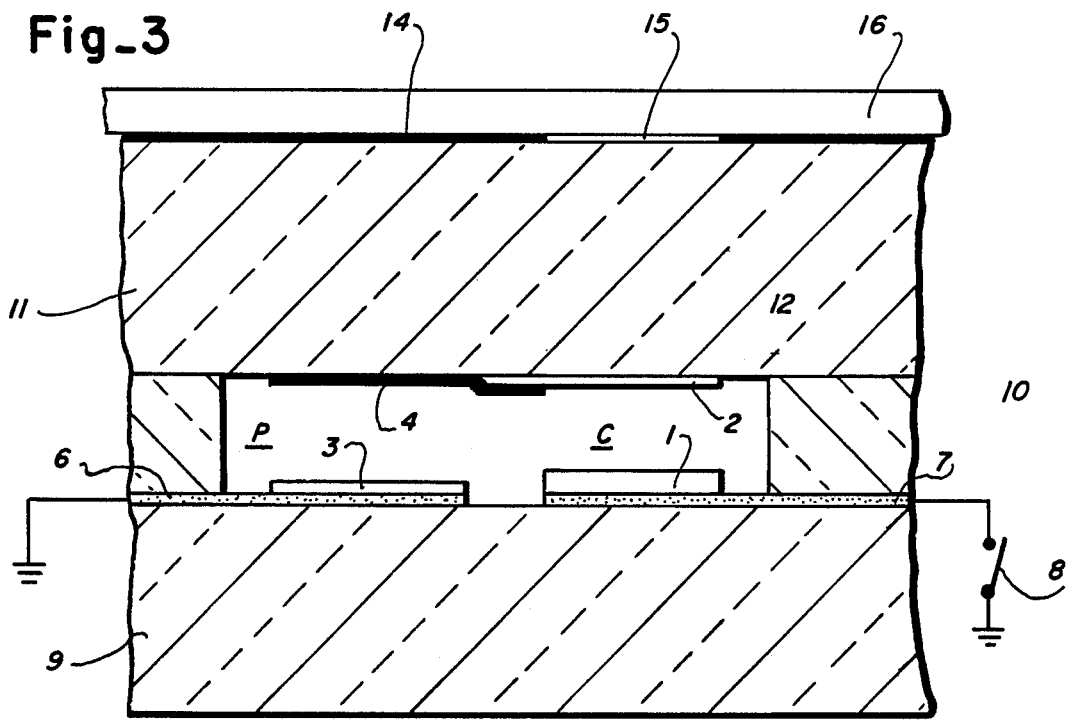
Fig_3
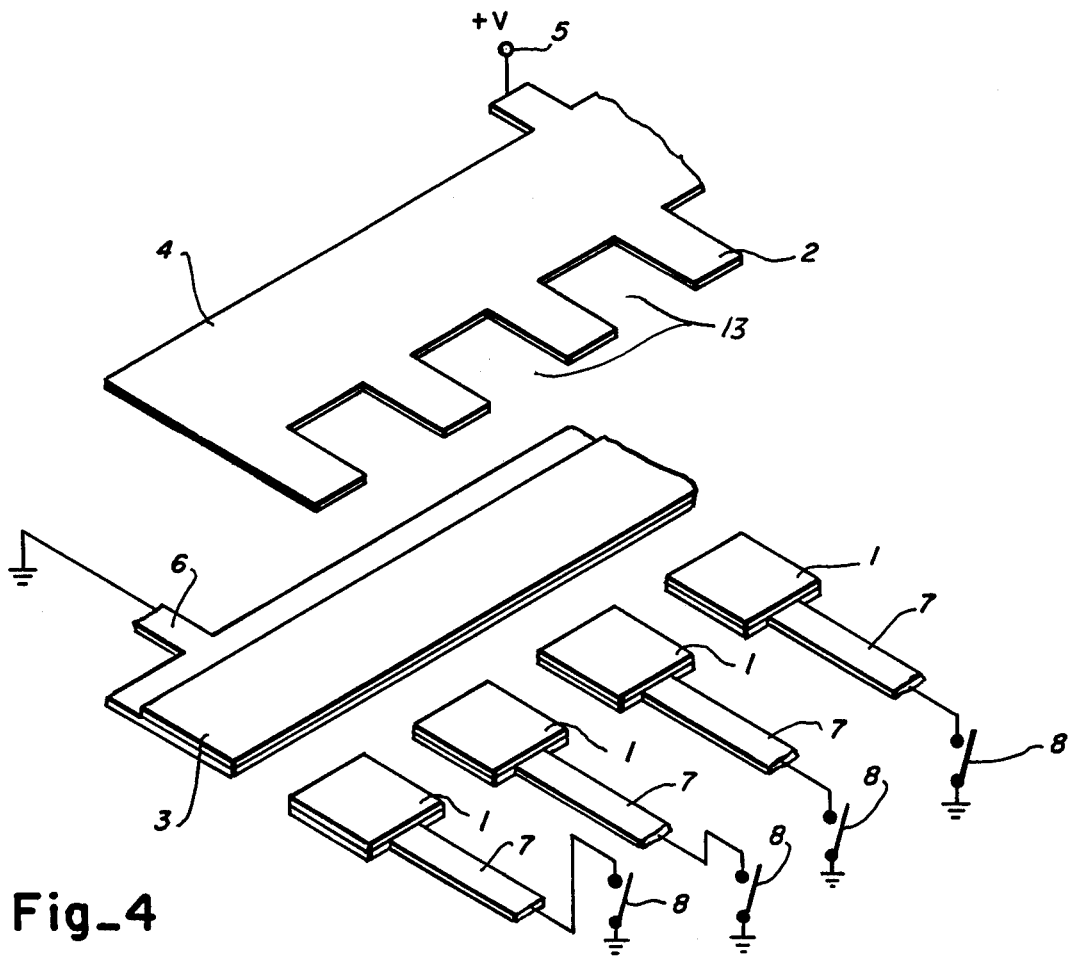
Fig_4

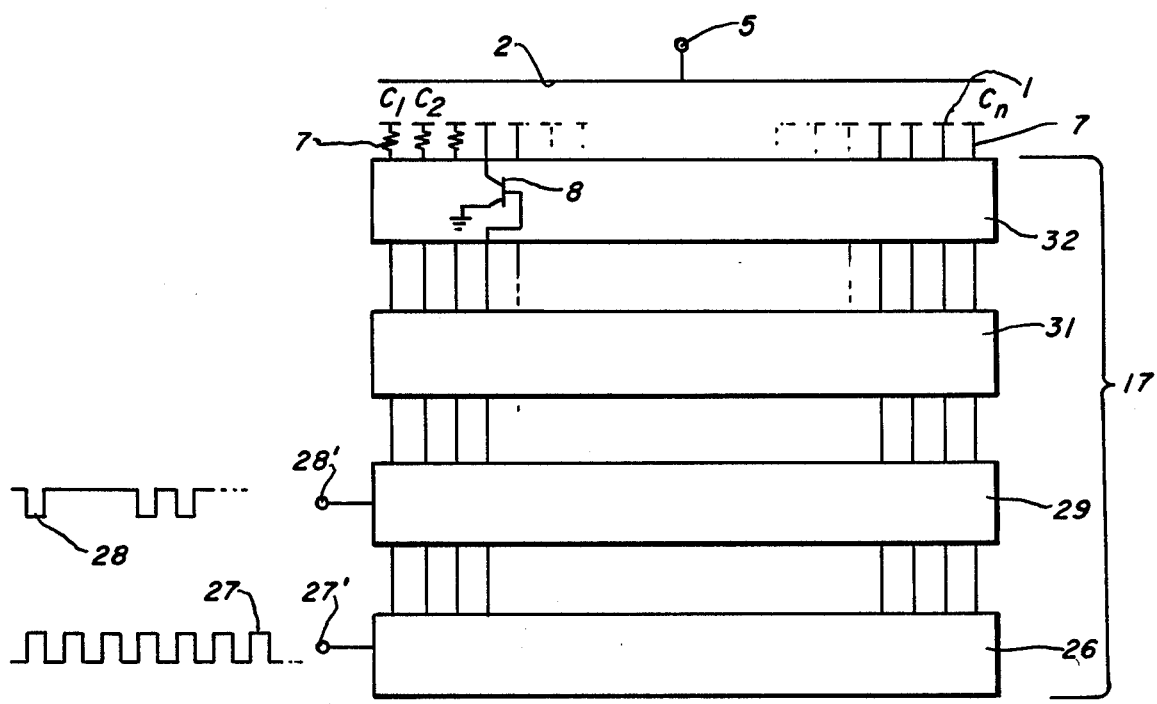
Fig_6
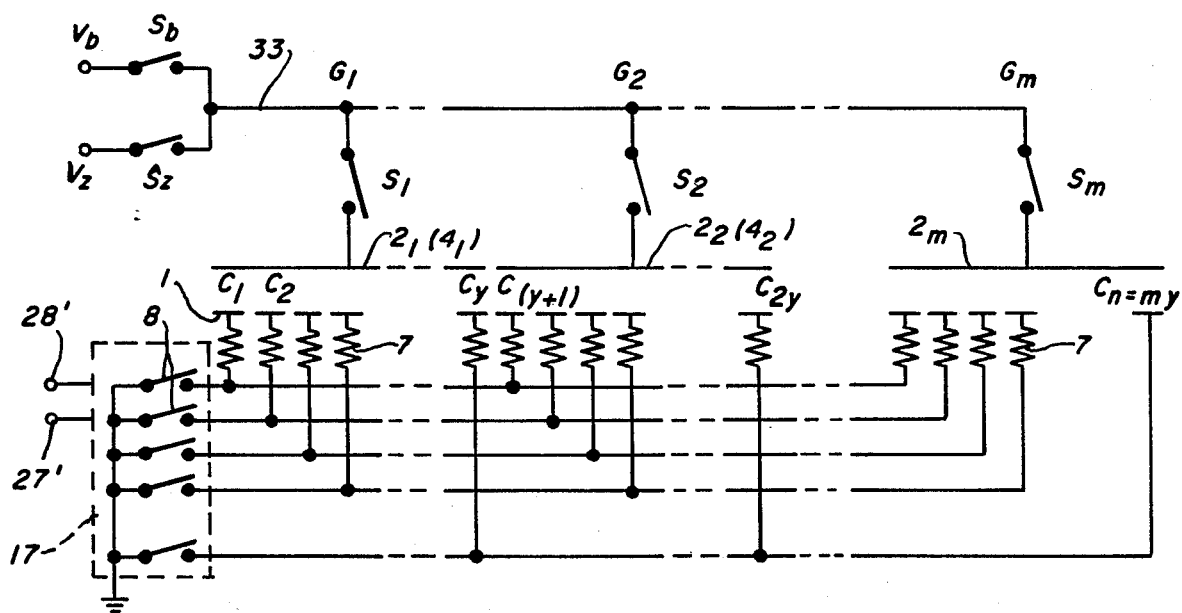
Fig_7

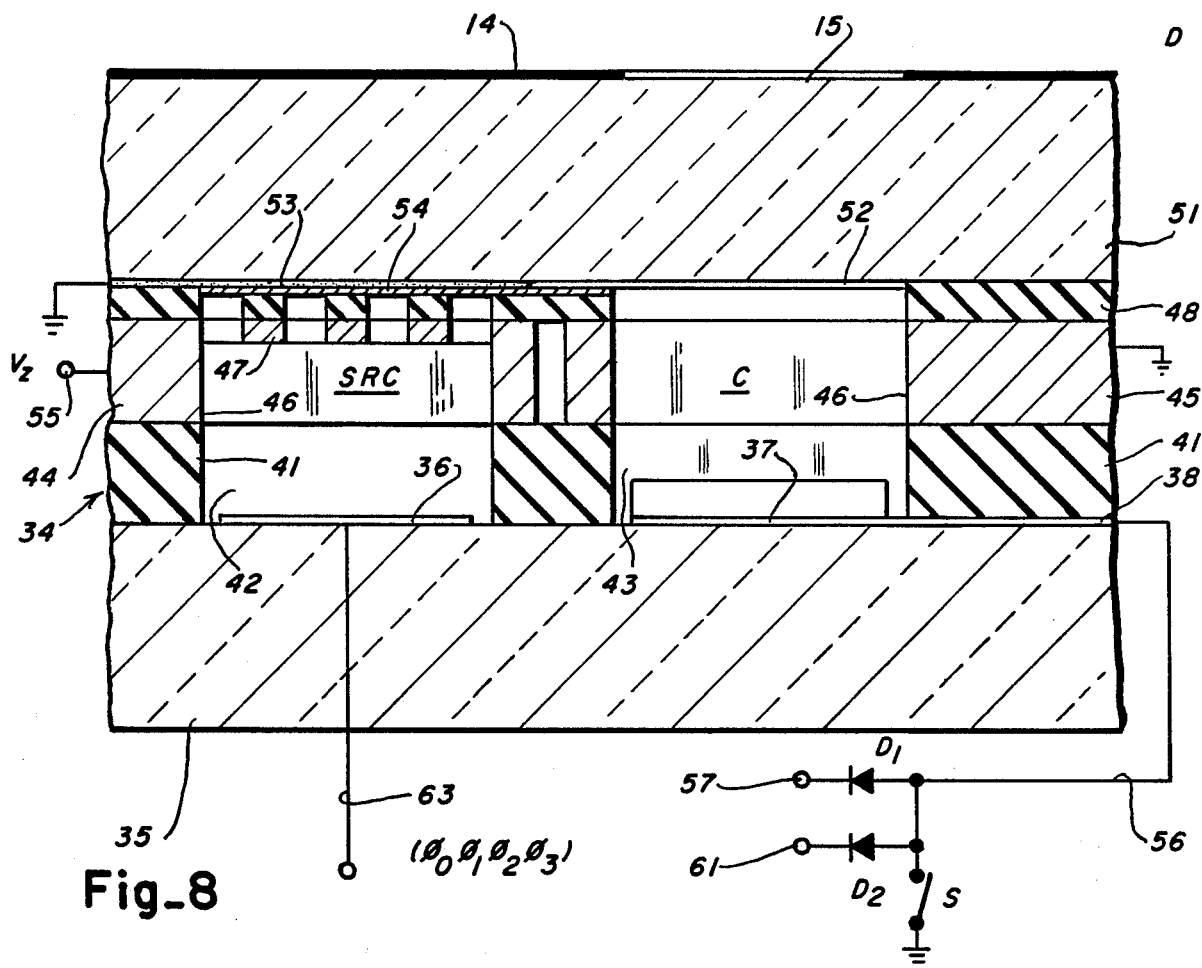
Fig_8
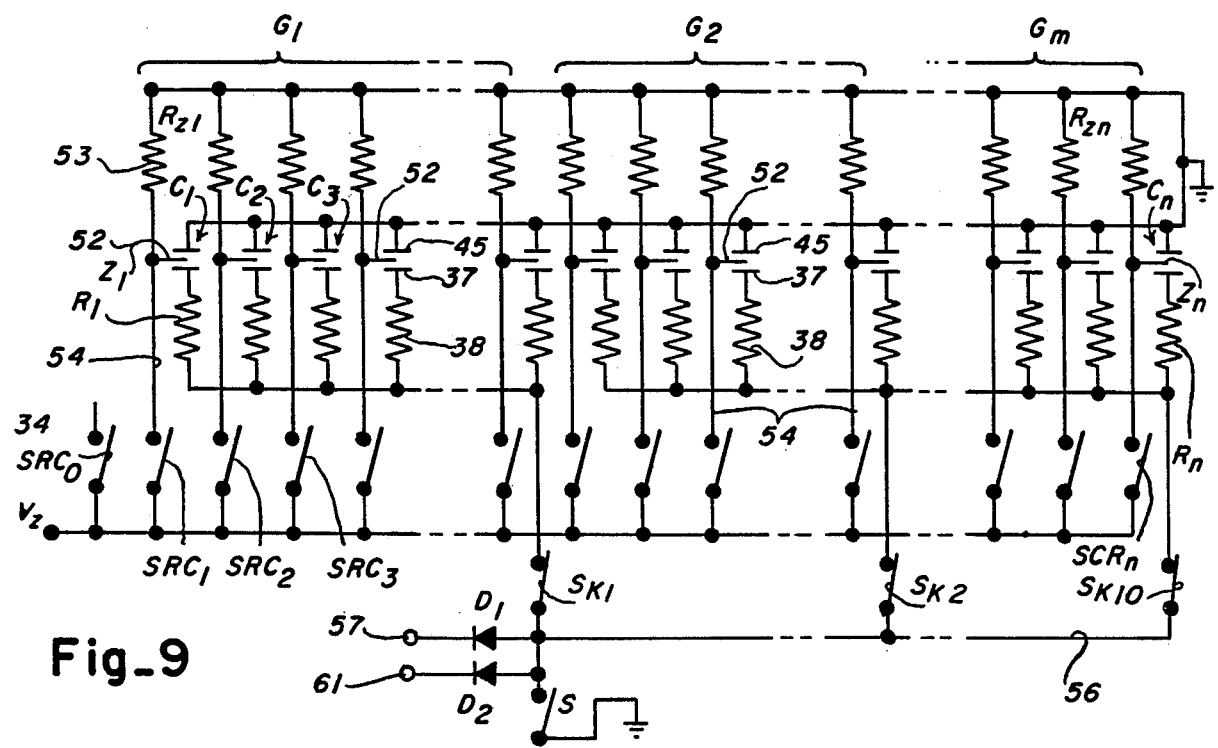
Fig_9

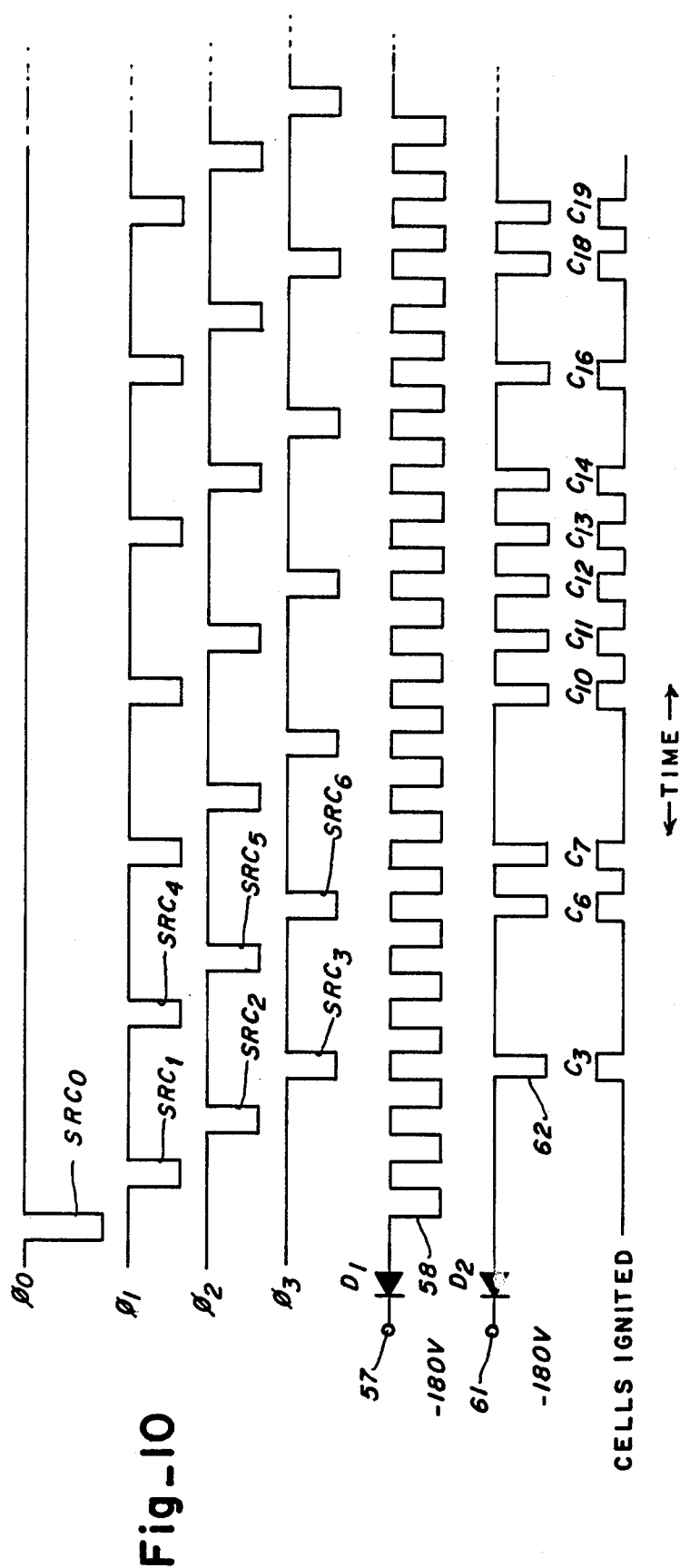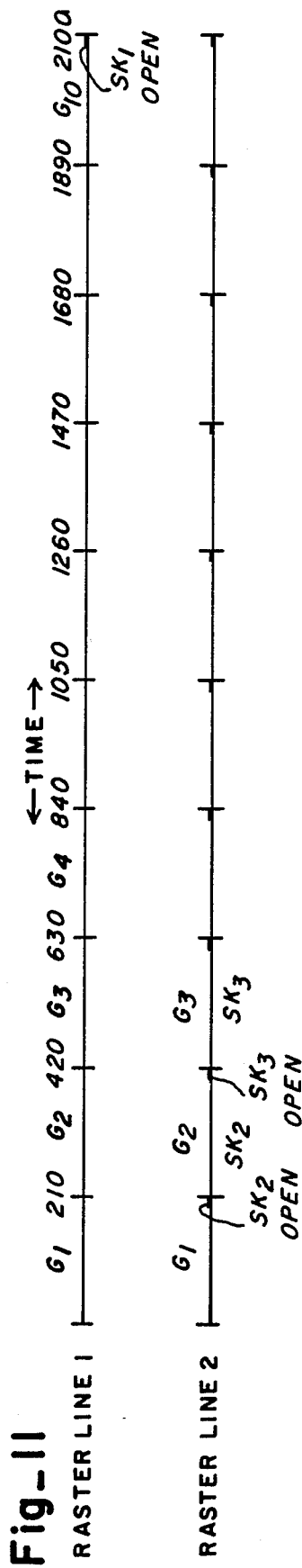

LINEAR D.C. GAS DISCHARGE DISPLAYS AND ADDRESSING TECHNIQUES THEREFOR

This application is a continuation of application Ser. No. 538,323, filed Oct. 3, 1983, now abandoned.

This invention relates to methods and apparatus for the point to point exposure of a uniformly electrostatically charged photoconductive insulator; more particularly it relates to methods and apparatus wherein point light emissions result from gas discharges in an array of illuminable gas discharge cells in response to applied video pulse trains.

Systems for the point to point exposure of a charged photoconductive insulator, e.g. a selenium drum, by means of a laser beam, are known to the art as exemplified by U.S. Pat. No. 4,046,471. In such systems the laser beam is deflected along the drum axis by means of a polygonal mirror and the beam is modulated according to video information. These systems allow high resolution and high speed recording in excess of 100 DIN A4 pages per minute. They are, however, relatively expensive due to costly mechanics.

In other prior art systems light emitted by the beam spot of a scanning cathode ray modulated by video information is transmitted via fiber optic rods, or other optics, to the surface of a charged photoconductive insulator. In these systems the optic arrangements are costly to manufacture and, due to the fact that only a small portion of the light emitted by the beam spot is used because of small apertures, the light intensity of the beam spot must be high thereby limiting the life of the phosphor coating on the cathode ray tube.

Also known to the prior art are systems which employ linear arrays of light emitting diodes (LED's) positioned directly above a photoconductive insulator to be exposed with each LED representing a line point to be exposed. The light density of a LED is, however, considerably lower than that of a laser beam or the beam spot of a cathode ray tube and, as lower density requires longer exposure times, recording speeds are slow. Further, while LED arrays have the advantage of space efficiency over the above-described prior art systems, the Gallium Arsenide (Ga As) crystals on which they are produced are of small size. Thus, many crystals must be put together to form an array equal to the axial length of a photoconductive insulator drum capable of handling a line of a DIN A4 size page having line lengths on the order of 210–297 millimeters. This is difficult to accomplish without interruptions between crystals forming the array.

In accordance with the invention the disadvantages of the prior art systems are overcome in the provision of a linear array of illuminable light emitting gas discharge cells having a continuous uninterrupted length equal to the line length of a DIN A4 size page, or any length, to provide, when ignited in response to video signals, point to point illumination for the line exposure of a uniformly charged photoconductive insulator.

In accordance with the invention provisions are made for pre-ionizing or conditioning the light emitting gas discharge cells to enable instantaneous ignition of the gas discharge cells in response to video signals and for controlling the duration of the light emitting dischargeage.

A feature of the invention resides in the fact that as the light emitting gas discharge cells and associated electrodes are formed on a glass substrate there is no limitation on the length of the arrays as with LED arrays on Ga As crystals. While light intensities resulting from gas discharges in the illuminable gas discharge cells are low compared to the intensity of a laser beam, provisions are made for increasing recording speeds through parallel terminal control of gas discharge cells in the array as well as other terminal arrangements.

In order to keep the sputter rate of the electrodes bounding the gas discharge cells at an insignificant low level, relatively low current densities are used to ignite or discharge the light emitting gas discharge cells. Under these conditions a luminance $E = 3 \times 10^4$ candles/square meter can be achieved (J. Smith IEEE Trans. on Election Devices Volume Ed. 20, No. 11, November 1973, pg. 1103). Thus with a gas discharge cell having a window area S of $6400 \times 10^{-12}$ Square meters (80 microns × 80 microns) and, assuming a point light source, a luminous flux $F = 4\pi ES$ or $2.5 \times 10^{-3}$ lumens can be developed at the window surface. If only half of this luminous flux F can be used, and converting to the radiometric equivalent (1 lumen = $1.5 \times 10^{-3}$ watts at 0.55 micron wavelength) as a basis for a first approximation, a useful radiant flux $\phi$ of $1.875 \times 10^{-6}$ watts is obtained. If this radiant flux $\phi$ falls on a point area of 100 microns by 100 microns on the surface of a selenium drum, the irradiation G on the point area is $1.875 \times 10^2$ watts/square meter. As the radiant energy U required to discharge a charged selenium drum is on the order of $10^{-2}$ watt-seconds/square meter, the time t necessary to discharge a point area, i.e. the radiant energy U required divided by the irradiation G on the point area, is approximately 50 microseconds.

To write or record points at 0.1 mm intervals means that a DIN A4 size page will have approximately 2000 points in a line and have 3000 lines of points. Thus, the number of points to be exposed to record a page is $6 \times 10^6$. At 50 microseconds per point this means that to serially illuminate each of the $6 \times 10^6$ points comprising a page would require 300 seconds or 5 minutes. This time, however, may be reduced considerably if all of the 2000 gas discharge cells in the linear array are ignited simultaneously. Thus a line of points can be exposed in 50 microseconds and a page of 3000 lines of points in 0.15 seconds or approximately 400 pages/minute. Thus with parallel control speeds approaching those of a laser printer can be achieved.

An object of the invention is in the provision of a linear array of illuminable gas discharge cells adapted when discharged to illuminate a photoconductive insulator through a window bounding the gas discharge cells.

Another object of the invention is in the provision of a linear array of gas discharge cells bounded by light transmitting windows whereby when ignited to discharge by voltage pulses representing video information the luminous flux generated by the discharges illuminates corresponding points on a photoconductive insulator.

Another object of the invention is to provide arrangements for pre-ionizing gas discharge cells of an array of illuminable gas discharge cells having windows for transmitting the light generated by gas discharges in the cells whereby ignition in response to video signals is instantaneous.

A further object of the invention resides in a method for simultaneously effecting discharges in all of the illuminable gas discharge cells of a linear array.

A still further object of the invention is to provide a linear array of gas discharge cells divided into groups and a method for igniting gas discharge cells in the groups in parallel, one group after another in turn.

A still further object of the invention is in the provision of a gas discharge shift register for conditioning the gas discharge cells of an array of light discharge cells for ignition by video pulse trains.

Other objects, features and advantages of the present invention will become better known to those skilled in the art from a reading of the following detailed description when taken in conjunction with the accompanying drawing wherein like reference numerals designate like or corresponding elements throughout the several views thereof and wherein:

FIG. 1 is a circuit diagram of a gas discharge cell showing one embodiment for conditioning or pre-ionizing the cells;

FIG. 2 is a circuit diagram of a gas discharge cell illustrating another embodiment for conditioning or pre-ionizing the cells;

FIG. 3 is a cross sectional view through a gas discharge cell of an array according to FIG. 1 of the invention;

FIG. 4 is a partial perspective view of an array of gas discharge cells as shown in FIG. 3 with an alternative anode structure.

FIG. 5 is a cross sectional view similar to FIG. 3 of a preferred embodiment of an array of light emitting gas discharge cells showing additional details;

FIG. 6 is a block diagram showing a switching arrangement for simultaneously driving all of the cells in an array of light emitting gas discharge cells in response to video pulse trains;

FIG. 7 is a schematic circuit diagram illustrating another switching arrangement for driving the cells in an array of gas discharge cells as shown in FIG. 3.

FIG. 8 is a cross sectional view of an array of light emitting gas discharge cells according to another embodiment of the invention and of an associated gas discharge shift register for serially conditioning the array of light emitting gas discharge cells;

FIG. 9 is a schematic circuit diagram of the embodiment shown in FIG. 8;

FIG. 10 shows timing diagrams illustrating the operation of the embodiment of FIGS. 8 and 9; and FIG. 11 showing a timing diagram illustrating the discharge interruption sequence of the gas discharge array of the embodiment of FIGS. 8 and 9.

Referring now to the drawing and with particular reference to FIGS. 1 and 3-5, there is shown a gas discharge display D comprising a linear array of cold cathode gas discharge cells generally designated by reference character C, and comprising a preionization section P common to the array of cells C. The cells C are bounded on one side by cathodes 1 and on the other side by a transparent anode 2 which is common to all of the cathodes 1 or, as will hereinafter appear with reference to FIG. 7, by a series of anodes 2 each common to serial groups of cathodes 1. The preionization section P is bounded on one side by a cathode 3 extending the length of the array and on the other side by a nontransparent anode 4 which also extends the length of the array of cells C and which is connected to anodes 2 of the cells C. The anodes 2 and 4 are connected to a positive voltage terminal 5 and the cathode 3 of the preionization section P is connected to ground via a resistor 6 whose value is chosen such that the voltage drop across anode 4 and cathode 3 is just above ionization potential thereby to condition or preionize the adjacent cells C for instantaneous ignition, i.e. the voltage drop is such that a constantly weak burning discharge current exhibiting negligible light emission is maintained in the preionization section P and the adjacent cells C are preionized or primed. As shown in FIGS. 1, 3, 4, 5 the cathodes 1 of the individual cells C are connected to resistors 7 and adapted to be connected to ground upon application of a video pulse signal represented by closure of electronic switches B. Closure of a switch 8 will cause instantaneous ignition of the associated primed cell C resulting in light output therefrom through the transparent anode 2.

Another embodiment for directly conditioning, preionizing or priming the cells C is shown in FIG. 2, wherein elements corresponding to those in FIG. 1 are designated with primed reference numerals. In the embodiment of FIG. 2 the gas discharge display does not employ a preionization section P. Instead cathodes 1' of the cells C' are connected to ground via a resistor 6' which is in parallel to resistor 7' and switch 8'. In this embodiment also the voltage drop across the cell anode 2 and cathode 1 is such that a weak discharge current exhibiting negligible light emission is established in the cells C' which is sufficient to condition or prime the gas discharge cells C' for instantaneous ignition upon closure of associated switches 8'.

The physical structure of the embodiment schematically shown in FIG. 1 is illustrated in FIGS. 3 and 4.

With particular reference to FIG. 3, a cross section of one gas discharge cell C of the array of gas discharge cells comprising a linear display D is shown comprising a glass substrate 9 spaced below and parallel to a thin glass plate 11 which is preferably on the order of 100 microns in thickness. The glass plate 11 is supported parallel to and above the glass substrate 9 by spacers 10 on the order of 50 microns thick which are glued or bonded to substrate 9 and plate 11, thereby to define between glass substrate 9 and glass plate 11 a gas space 12 extending along the length of the array. Gas space 12 is filled with a gas comprising neon or neon +0.1% argon under suitable pressure, e.g. 500 millibars.

As shown in FIG. 3 the non-transparent anode 4 and the transparent anode 2 are deposited in overlapping relationship on the underside of the thin glass plate 11 opposite, respectively, the common cathode 3 of the preionization section P and the line of individual cathodes 1.

As shown in FIGS. 3 and 4, the individual cathodes 1 are deposited on strips of resistive material, constituting resistors 7 which are deposited on the substrate 9. The cathode 3 of the preionization section P is also deposited on a strip of resistive material, constituting resistor 6. As shown, resistor 6 extends to the left side of the array and is connected directly to ground, and resistors 7 extend to the right side of the array and are connected to ground via electronic switches 8, the closure of a switch representing application of a video pulse to a cathode 1.

FIG. 4 shows an alternative anode electrode structure wherein both anodes 4 and 2 constitute on layer which is provided with apertures 13 opposite the cathodes 1 to permit light emission from the cells C. In this embodiment, the apertured anode 2 constitutes the transparent anodes with discharge occurring between cathodes 1 and the edges of the apertures 13.

As further seen in FIG. 3 the upper surface of the thin glass plate 11 is coated with a light blocking layer 14 having discrete windows 15 opposite the transparent anode(s) 2 to permit light generated in the gas discharge cells C to pass out, to expose the surface of a charged photo-conductive insulator 16 positioned opposite the windows 15 at a spacing therefrom on the order of 100 microns. The light blocking layer 14 between windows 15 preclude emissions from one cell C from reaching the windows 15 opposite neighboring cells C.

The electrodes comprising the anodes and cathodes, the resistor 6 and the layers constituting resistors 7 are deposited by well-known photolithographic techniques. Cathodes 1 of the gas discharge cells C are preferably made of an electroformed nickel on the order of 10 microns in thickness. The material constituting resistor 6 and resistors 7 preferably is of high resistance material such as NiCr applied by sputtering techniques.

Referring particularly to FIG. 5, additional elements of the construction of the display D shown in FIG. 3 are illustrated. As shown in FIG. 5, integrated circuits, generally designated by reference numeral 17, embody, among other elements to described with reference to FIG. 6, the electronic switches 8 schematically shown in FIG. 1. The integrated circuits 17 are bonded to the exterior terminal ends of the resistors 7 or to leads facilitating connection thereto.

As shown in FIG. 5 a bore 18 extending through the glass substrate 9 at each end of the array connects the gas space 12 to a gas reservoir 21 formed between the substrate 9 and a parallel lower plate 22 separated from the substrate 9 by spacers 23 on the order of 2 millimeters in thickness. With the reservoir 21, pressure differences in gas space 12 caused by temperature increases resulting, for example, from gas discharges in the cells C will be equalized. As shown, lower plate 22 has a hole 24 which is connected to a pumping stem 25. After the assembly is glued together the array is evacuated through stem 25 and is then filled with the gas to be used, e.g. neon or neon +0.1% argon at a pressure of 200–500 millibars. Following that the pumping stem 25 is sealed and the array is ready for operation.

Referring now to FIG. 6 the integrated circuitry 17 connected to the resistors 7 on which the cathodes 1 of cells C are deposited, includes a shift register 26 driven by clock pulses 27 applied thereto via terminal 27'. The output of the shift register 26 is applied to serially gate negative pulses 28 representing video information in a raster line of n information points to be displayed and applied via terminal 28' into an n stage memory 29. The video information pulses 28 stored in memory 29 are transferred in parallel to a second n stage memory 31 whose output controls the flow of current in n drive transistors which correspond to the switches 8 (FIGS. 1 and 3-5) connected to resistors 7 on which cathodes 1 are deposited. Those cathodes 1 connected to ground through associated drive transistors 8 cause the voltage across associated conditioned cells C to rise above the ionization potential, resulting in gas discharges producing light which is emitted through associated apertured or transparent anodes 2 and windows 15. During the time memory 31 is being read out, memory 29 can again be serially loaded with the next raster line of video information pulses 28. If gray scales are to be reproduced, sample and hold circuits may be used in the memories, otherwise simple digital memories are used. If gray scales are desired resistors 7 and switches 8 may be embodied in transistors having the function of adjustable resistors.

In accordance with the embodiment of FIG. 7 the number of terminals and stages in integrated circuit 17 necessary to operate an array of n gas discharge cells C may be significantly reduced, though recording speeds will be slower than that obtainable in the FIG. 6 embodiment wherein all n=2000 cells are addressed in parallel. In FIG. 7, instead of addressing all of the n gas discharge cells C in parallel, as described with reference to FIG. 6, the n gas discharge cells C are divided into m groups G of y gas discharge cells for group serial write-out with the y gas discharge cells C in each group G read in parallel.

Thus as shown in FIG. 7 an array of n gas cells C is divided into groups $G_1$–$G_m$ each of y gas cells. Each of the groups is associated with a preionization section $P_1$–$P_m$ not shown in FIG. 7 comprising an anode 4, cathode 3 and a resistor 6. Associated with each group G is a separate anode $2_1$, $2_2$–$2_m$ each of which is connected through an associated switch $S_1$, $S_2$–$S_m$ to a common line 33. The line 33 is adapted to be connected via switches $S_b$ or $S_z$ to positive voltage source terminals $V_b$ and $V_z$, respectively. An array of n=2000 gas discharge cells C, for example, could therefore be divided into 40 groups of 50 gas discharge cells C. Thus an integrated semiconductor circuit 17 with only y=50 switching stages instead of the n stages of FIG. 6 would be required for addressing, in parallel, the 50 gas discharge cells C in a group of y cells with the m groups G being addressed serially. Thus 50 microseconds for addressing each group G, times 40 groups, or 2 milliseconds would be required to write a point line of video information.

To address the groups $G_1$–$G_m$ serially, y lines from y drive transistors B (50 in the example given) are connected as shown in FIG. 7 to corresponding ones of the 50 cathodes 1 in each group. In operation, video information pulses 28 corresponding to first y point positions in a line of n point positions are serially read into a memory 29 of y stages, then the second series of y point positions, etc. Approximately one microsecond before the transfer of information from memory 29 to memory 31, switch $S_1$ to the first anode $2_1$ and switch $S_z$ are closed, thus applying a priming voltage $V_z$ to anode $4_1$ and $2_1$ to pre-ioize all of the y gas discharge cells C in group $G_1$ within 1 microsecond. After the one microsecond pre-ionizing interval switch $S_z$ is opened and switch $S_b$ is closed to apply a lower voltage $V_b$ sufficient for effecting gas discharges in the y cells upon parallel application of y video pulses 28 from memory 31 to selected cathodes 1 of the y gas discharge cells C in Group $G_1$ via 50 drive transistors S over a 50 microsecond interval. Following the parallel addressing of the cells C in the first group $G_1$ of 50 cells, with switch $S_b$ remaining closed, $S_1$ is opened and $S_2$ is closed. The next 50 video pulses 28, i.e. y+1–2y are transferred from memory 29 to memory 31, etc. Temporary application of the voltage $V_z$ to the second and subsequent anodes $2_1$–$2_m$ of the m groups is not necessary because the first gas cell C (y+1) associated with the second anode $2_2$ is preionized as a result of a discharge in the preceding gas cell y in the first group $G_1$.

As is evident, the recording speed is slower than the n=2000 stage parallel arrangement of FIG. 6 by a factor of 50. This is true however only if it is assumed that the gas cell discharges produce the same luminous flux as in the FIG. 6 embodiment. However, due to the fact that the frequency of cell discharge is, in this embodiment, lower by a factor of 40, higher ionization voltages $V_b$ can be used to discharge the gas cells C with resulting higher luminous flux output, thus allowing the time of the discharges to be reduced by a factor of 5–10.

In accordance with the embodiment shown in FIGS. 8 and 9, the number of terminals necessary to drive an array may be reduced still further and without the necessity for memories 29 and 31, but again at the expense of recording speed. In FIGS. 8 and 9 the light generating gas discharge cells C of an array are serially conditioned by a gas discharge shift register and ignited or discharged by synchronous, directly-applied video information pulses.

Referring first to FIG. 8, there is shown a cross-section perpendicular to the line array of the construction of one individual illuminable gas discharge cell C of a gas discharge display D, and one gas discharge cell SRC of a parallel gas discharge shift register generally designated by reference numeral 34.

The arrangement is constructed on a glass substrate 35. On it are cathodes 36 of the shift register cells SRC preferably of molybdenum 2 microns thick and cathodes 37 of gas discharge cells C of the gas discharge display D on the order of 10 microns thick. The connections to the cathodes 37 are formed as thin layer type resistors 38 designated $R_1$–$R_n$ (FIG. 9). An insulating layer 41, e.g. of polyimide, approx. 20 microns thick, is deposited on the glass substrate 35 and is photolithographically formed to provide a channel 42 traversing the length of the shift register array 34 above the cathodes 36 thereof, and is formed to provide box like openings 43 having square areas above and corresponding in area to that of cathodes 37 whose area is approximately 80 microns by 80 microns.

Located on the insulating layer 41 are electroformed perforated metal strips 44 and 45 approximately 20 microns thick which are laterally spaced from one another. The perforations 46 in the strips 44 and 45 are located above and respectively correspond in area to that of the cathodes 36 of the shift register 34 and that of the cathddes 37 of the gas discharge cells C. A strip of thin metal mesh net 47 formed with the strip 44 is located within the perforations 46 of the metal strip 44 above the shift register cathodes 36. The net 47 is on the order of 5 microns in thickness with apertures on the order of 10 microns.

An insulating layer 48 of approximately 2 microns thickness is next deposited onto the upper surface of metal strip 44, metal net 47 and metal strip 45, whereby the openings in the insulating layer 48 correspond to the openings in the metal net 47 and the perforations 46 in metal strip 45.

Located above the insulating layer 48 is a glass plate 51 adapted to be bonded to the glass substrate 35 as by spacers (not shown). On the underside of the glass plate 51 there are deposited transparent ignition or discharge conditioning electrodes 52 on the order of 1 micron thick, designated $Z_1$–$Z_n$ in FIG. 9, located opposite the line of cathodes 37 of the gas discharge cells C. Also deposited on the underside of the glass plate 51 is a resistive layer 53 on the order of 0.1 micron in thickness, located opposite the shift register cathodes 36 and connected to ignition electrodes 52. Resistive layer 53 carries an electrode 54 on the order of 0.5 microns in thickness which partly overlaps the transparent electrodes 52 in the area between strips 44 and 45. Resistive layer 53 defines the resistors designated $R_{z1}$–$R_{zn}$ in FIG. 9.

As shown in FIGS. 8 and 9, resistive layer 53 of the shift register cells SRC is connected to ground as is the metal strip 45 defining gas discharge cells C, while the metal strip 44 and connected net 47, defining the shift register cells SRC, are connected to a voltage terminal 55 for application of voltages $V_z$ of from 50–80 volts positive. The metal strip 45 constitutes the anode of the gas discharge cells C, while the transparent electrode 52 constitutes an ignition electrode which is connected to ground via resistors 53, designated $R_{z1}$–$R_{zn}$ in FIG. 9. Transparent electrode 52 may, as in the anode structure shown in FIG. 4, be an apertured extension of electrode 54. The metal strip 44 and metal net 47 constitute the anode of the shift register cells SRC, which are schematically represented as switches $SRC_1$–$SRC_n$ in FIG. 9.

In another embodiment (not shown) the glass plate 51 may be fabricated with an array of fiber optic rods opposite transparent electrodes 52 corresponding in number to the gas discharge cells C.

With further reference to FIGS. 8 and 9, the cathodes 37 of the gas discharge cells C, via series resistors 38 designated $R_1$–$R_n$ in FIG. 9, are connected over a line 56 and via a diode $D_1$ to a terminal 57 to which one microsecond negative voltage pulses 58 (FIG. 10) are continuously applied. As will hereinafter appear, the magnitude of the pulses 58 on the order of 180 volts negative is insufficient to ignite the gas discharge cells C.

Further as shown in FIGS. 8 and 9 the line 56 is also connected via a diode D2 to a terminal 61 to which video information pulses 62 (FIG. 10) representing a raster line of information is applied. Line 56 is also connected via a switch S to ground.

In operation the cells SRC of the gas discharge shift register 34 are sequentially discharged by means of the three-phase control of the cathodes 36 over lines generally designated 63 in a manner known in prior art and described for example in an article "A New Gas Discharge Device for Electrostatic Printing", IEEE Transactions on Electron Devices, Vol. Ed. 21, No. 9, September, 1974. The sequential discharge of the shift register cells SRC by applied pulses $\phi_1$, $\phi_2$, $\phi_3$ is shown in the timing diagram of FIG. 10.

With further reference to FIG. 8 and to FIG. 10, when a discharge of a shift register cell SRC occurs between cathode 36 and the anode comprising metal strip 44 and metal net 47, the areas between the meshes of the metal net 47 become electrically conductive and electrode 54 goes to 50–80 volts positive, whereby the connected transparent ignition electrode 52 also rises to the potential (50–80 volts positive) of the metal net 47 thereby conditioning the associated gas discharge cell C for ignition, which will occur if a negative 180 volt video information pulse 62, via diode D2, is simultaneously applied to the cathode 37. Such video information pulses 62 are shown in FIG. 10 as occurring, for example, at point positions 3, 6, 7, 10, etc. The resulting difference in potential of approximately 250 V across the gas discharge cell C as a result of an applied video pulse to a conditioned cell C will be sufficient to ignite a discharge. After a discharge in a shift register cell SRC is extinguished, the potential on the transparent electrode 52 is drawn to 0 V once again by the resistor 53. The discharge in an ignited gas discharge cell C however will be sustained by the pulses 58 which occur between discharges of the shift register cells SRC as shown in FIG. 10.

More particularly with reference to FIG. 9, the gas discharge cells $C_1$–$C_n$ are serially conditioned by gas discharge shift register 34 for ignition. The series resistors 38, $R_1$ to $R_n$, and the diode $D_1$ which carries pulses 58 set the cathodes 37 of discharge cells $C_1$ to $C_n$ at a voltage which is switched between 0 V and approximately $-180$ V with a duty cycle of approximately 1:1, and a pulse width of approximately 1 microsecond. Switch S is closed for a short time at the end of each one microsecond pulse 58 in order to return the cathodes 37 to 0 V. With the anodes 45 of the gas discharge cells C set at ground potential, the voltage pulses 58 of $-180$ V on the cathodes 37, as noted before, are not sufficient to ignite a gas discharge in the gas discharge cells C; they are however sufficient to maintain a discharge once the cells C are ignited since, although the discharge extinguishes at the end of every pulse 58, the cells C are reignited again by the next following pulse 58 due to the charge still present in the gas discharge cell C at the beginning of succeeding pulses 58. When the transparent ignition electrodes 52, $Z_1$ to $Z_n$ in FIG. 9, which normally in their resting state are held at ground potential by the resistors 53, $R_{z1}$ to $R_{zn}$, are condtioned serially by the closure of switches $SRC_1$–$SRC_n$ (representing the shift register cells) for approximately one microsecond, the ignition electrodes 52 rise to approximately $+50$ V to $+80$ V for approximately 1 microsecond, followed by an open switch interval of aproximately 1 microsecond before the next switch SRC closes. As illustrated in the pulse diagram of FIG. 10, the open switch intervals of the cells SRC occur simultaneously with the application via diode $D_1$ of voltage pulses 58 of approximately 180 V to the cathodes 37, and vice versa. Thus none of the cells $C_1$ to $C_n$ are ignited in this type of operation, because the voltage pulses 58 are not applied to the cathodes 37 when the ignition electrodes 52 rise to 50–80 volts positive incident to discharge of the shift register cells SRC.

As shown in FIG. 10 the ignition of a particular cell C will however occur in intervals between negative-going voltage pulses 58, when a video information pulse 62 of approximately $-180$ V is applied via diode $D_2$ and one of the switches $SRC_1$ to $SRC_n$ is closed at the same time. The difference in potential of approximately 250 V between the ignition electrode 52 and the cathode 37 of the corresponding cell C causes a discharge in this cell C and luminous display of the video information. The discharge of the ignited cell C is sustained as noted earlier by the voltage pulses 58, and is interrupted only when the pulses 58 are interrupted for approximately 5 pulses 58. During this interruption the remaining residual charge is broken down enough so that another discharge does not occur when the voltage pulses 58 are reapplied. Gray steps cannot be reproduced with this arrangement because the cells C only have "on" and "off" conditions.

As is evident from the foregoing, a gas discharge cell C once ignited is sustained by pulses 58, and therefore earlier ignited cells C in the array burn significantly longer than later ignited cells C during a traverse of the array.

This is avoided or considerably reduced as shown in FIG. 9 by subdividing the cathodes 37 into, for example, ten groups, $G_1$, $G_2$–$G_{10}$, with each group connected to terminals 57 and 61 via switches $SK_1$–$SK_{10}$ in FIG. 11 the switches SK are normaly all closed while the array is being serially traversed by the shift register 34 and addressed by a raster line of video information pulses 62. Five pulses 58 before the end of the first traverse of the array, switch $SK_1$ is opened, thereby extinguishing all of those cells C ignited in group $G_1$, thus enabling it to again be addressed by video pulses 62 in the second traverse or scan, without interruption. During the second scan wherein cells 1–210 are being ignited by video information pulses 62, those cells 211 to 2100 which were ignited in the first scan continue to display the information of the first raster line. Five pulses short of the end of the first group of 210 pulses 58, in the second scan, $SK_2$ is opened so that all previously ignited cells C associated with $SK_2$ are extinguished at the 210th pulse, thus enabling application of video information pulses 62 to cells 211–420 in the second scan.

The sequence as shown in FIG. 11 illustrates that in the first scan the first group $G_1$ of 210 cells C remain on for 2100–5 pulses and the second group of cells 211–420 for 1885 pulses, etc. In the second scan the second group $G_2$ will remain on for an additional 205 pulses and the third for 415, etc. Thus all cells ignited in one scan remain ignited for 2100–5 pulses.

The lighting durations between the first and last discharge cell C of a group G does not result in any significant difference in density due to the steep gradation of the electrophotographic process. An advantage of the FIG. 9 embodiment is that fewer terminal wires are necessary requiring, with subdivision of cells C into ten groups, a total of 18 terminal wires.

As will be appreciated, a raster line of 2100 points can be addressed in 4200 microseconds$\times$3000 lines=12.6 seconds, corresponding to approximately 5 pages/min.

The invention claimed is:

1. A display device comprising
  two gas discharge spaces defined between two insulating substrates to extend in parallel,
  a plurality of shift register electrodes on a first of said insulating sustrates, arranged in sequence in a first of said gas discharge spaces,
  a plurality of first thin film resistors on the second of said insulating substrates and extending respectively opposite said shift register electrodes,
  an insulating layer on said second insulating substrate with said first thin film resistors, said insulating layer having apertures therein adjacent said first gas discharge space opposite each said shift register electrode and adjacent the second gas discharge space,
  a plurality of conducting layers respectively covering said first thin film resistors in said apertures, each said conducting layer extending on said second insulating substrate into the second gas discharge space to provide a respective ignition electrode for said second gas discharge space,
  a common electrode layer on said insulating layer and between said insulating layer and first insulating substrate, with apertures in common with said apertures of said insulating layer, said common electrode layer providing two separate common electrodes for said two gas discharge spacers, respectively,
  a plurality of second thin film resistors extending on said first insulating substrate adjacent said second gas discharge space opposite respective ones of said ignition electrodes, a plurality of discharge electrodes in said second gas discharge space on respective ones of said second thin film resistors, for providing a respective plurality of discharge cells with the common electrode of the second gas discharge space, each said thin film resistor having an end extending on the respective one of said insulating substrates a distance from the respective gas discharge space, and voltage means for holding said common electrode for said first gas discharge space at a first potential, for holding said end of each first thin film resistor and said common electrode of said second gas discharge space at a second potential, for applying predetermined switch pulses to said shift electrodes, and for applying in common to said ends of said second thin film resistors a serial train of selective video pulses, wherein said predetermined switch pulses are syncronized with said serial train so that the ignition electrode of each said discharge cell is brought to said second potential when a respective one of said selected video pulses is applied in common to said ends of the second thin film resistors, so that only a respective one of said discharge cells in selected to be ignited for each said selected video pulse.

2. The device of claim 1 comprising further pluralities of said discharge cells to define a linear array thereof, including further pluralities of said thin film resistors, conducting layers and discharge electrodes located along said gas discharge spaces, and said insulating and conducting layers and said common electrodes with respective ones of said apertures extending for all said discharge cells, and said voltage means including a plurality of switches, each said switch being connected at a first end to a respective common connection of said ends of a respective plurality of said second thin film resistors, and each said switch being connected in common at a second end for receiving said video pulses, wherein said ends of said second thin film resistors are separately commonly connected within each said plurality thereof, all of said ends of said first thin film resistors are commonly connected, and a plurality of sequences of said serial trains is provided in synchronization with operation of said switches and serial conditioning of all said discharge cells by said voltage means, and all of said discharge cells of said array are selectively discharged in sequence.

3. The device of claim 2, wherein said voltage means includes means for continuing to discharge the selected discharge cells of each said plurality, until a predetermined period prior to application at said common second end of said switches of the serial train for the next selection of discharge cells of the respective plurality.

* * * * *